United States Patent
Schick et al.

(10) Patent No.: US 8,898,279 B2
(45) Date of Patent: *Nov. 25, 2014

(54) CONNECTIVITY SERVICE-LEVEL GUARANTEE MONITORING AND CLAIM VALIDATION SYSTEMS AND METHODS

(75) Inventors: Irvin C. Schick, Newton, MA (US); Gregory Hersh, Cambridge, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 21 days.

This patent is subject to a terminal disclaimer.

(21) Appl. No.: 12/256,815

(22) Filed: Oct. 23, 2008

(65) Prior Publication Data
US 2009/0049170 A1 Feb. 19, 2009

Related U.S. Application Data

(60) Continuation of application No. 10/279,680, filed on Oct. 24, 2002, now Pat. No. 7,457,859, which is a division of application No. 09/450,601, filed on Nov. 30, 1999, now Pat. No. 6,745,242.

(51) Int. Cl.
*G06F 15/16* (2006.01)
*G06F 15/173* (2006.01)
*G06F 15/177* (2006.01)
*H04L 12/24* (2006.01)
*H04L 12/26* (2006.01)

(52) U.S. Cl.
CPC ........ *H04L 12/2697* (2013.01); *H04L 41/5009* (2013.01); *H04L 43/50* (2013.01); *H04L 41/5003* (2013.01)

USPC .......... 709/224; 709/203; 709/217; 709/223; 709/238; 715/736

(58) Field of Classification Search
USPC .......... 709/203, 217, 223, 224, 238; 715/736
See application file for complete search history.

(56) References Cited

U.S. PATENT DOCUMENTS

| | | | |
|---|---|---|---|
| 5,664,170 A * | 9/1997 | Taylor | 709/220 |
| 5,930,476 A | 7/1999 | Yamunachari et al. | |
| 6,006,016 A | 12/1999 | Faigon et al. | |
| 6,006,017 A | 12/1999 | Joshi et al. | |
| 6,058,102 A | 5/2000 | Drysdale et al. | |
| 6,065,139 A | 5/2000 | Mehta et al. | |
| 6,145,089 A | 11/2000 | Le et al. | |
| 6,169,881 B1 * | 1/2001 | Astrom et al. | 455/12.1 |

(Continued)

OTHER PUBLICATIONS

Calkins, "MultiPing—Versoin 1.3," http://members.xoom.com/dcalkins/multiping.htm, three pages, Jan. 22, 1999.

(Continued)

*Primary Examiner* — Ranodhi Serrao
*Assistant Examiner* — Farrukh Hussain

(57) ABSTRACT

A system monitors performance in a network that includes several network resources. The system obtains a list of targets in the network. The targets include selected ones of the resources. The system sends a request to the targets, receives responses from the targets, and determines a status of the targets based on the received responses or a lack of responses from the targets. The system then analyzes the status of the targets to determine compliance with the service-level guarantee.

13 Claims, 9 Drawing Sheets

(56) References Cited

U.S. PATENT DOCUMENTS

| | | | |
|---|---|---|---|
| 6,170,009 B1 | 1/2001 | Mandal et al. | |
| 6,195,697 B1 | 2/2001 | Bowman-Amuah | |
| 6,205,481 B1 * | 3/2001 | Heddaya et al. | 709/226 |
| 6,233,619 B1 * | 5/2001 | Narisi et al. | 709/230 |
| 6,256,747 B1 | 7/2001 | Inohara et al. | |
| 6,298,454 B1 | 10/2001 | Schleiss et al. | |
| 6,321,264 B1 | 11/2001 | Fletcher et al. | |
| 6,363,053 B1 | 3/2002 | Schuster et al. | |
| 6,366,563 B1 | 4/2002 | Weldon et al. | |
| 6,370,586 B2 | 4/2002 | Davis et al. | |
| 6,425,008 B1 | 7/2002 | Lecheler et al. | |
| 6,430,711 B1 | 8/2002 | Sekizawa | |
| 6,477,590 B1 | 11/2002 | Habusha et al. | |
| 6,493,348 B1 * | 12/2002 | Gelman et al. | 370/401 |
| 6,513,060 B1 | 1/2003 | Nixon et al. | |
| 6,539,427 B1 | 3/2003 | Natarajan et al. | |
| 6,542,466 B1 | 4/2003 | Pashtan et al. | |
| 6,556,659 B1 * | 4/2003 | Bowman-Amuah | 379/9.04 |
| 6,563,793 B1 * | 5/2003 | Golden et al. | 370/236 |
| 6,591,298 B1 * | 7/2003 | Spicer et al. | 709/224 |
| 6,606,663 B1 * | 8/2003 | Liao et al. | 709/229 |
| 6,643,612 B1 | 11/2003 | Lahat et al. | |
| 6,768,787 B1 | 7/2004 | Pester, III | |
| 6,795,400 B1 | 9/2004 | Schick | |
| 2008/0126178 A1 * | 5/2008 | Moore | 705/10 |
| 2009/0086642 A1 * | 4/2009 | Davis et al. | 370/242 |

OTHER PUBLICATIONS

Christias, "Ping—Send ICMP ECHO_Request Packets to Network Hosts," http://www.unidata.ucar.edu/cgi-bin/man-cgi?ping+8, four pages, Jun. 12, 1997.

* cited by examiner

500

| H-TYPE RECORD | | | ~510 |
|---|---|---|---|
| SOURCE NAME 511 | ID 512 | TIMESTAMP 513 | |

| S-TYPE RECORD | | | ~520 |
|---|---|---|---|
| SOURCE NAME 521 | ID 522 | TIMESTAMP 523 | |
| TARGET NAME 524 | | STATUS 525 | |

| E-TYPE RECORD | | | ~530 |
|---|---|---|---|
| SOURCE NAME 531 | ID 532 | TIMESTAMP 533 | |
| TARGET NAME 534 | | STATUS 535 | |

FIG. 5

CONNECTIVITY SERVICE-LEVEL GUARANTEE MONITORING AND CLAIM VALIDATION SYSTEMS AND METHODS

RELATED APPLICATIONS

This application is a continuation of and claims priority to U.S. patent application Ser. No. 10/279,680, filed Oct. 24, 2002, which is a divisional of U.S. patent application Ser. No. 09/450,601, now U.S. Pat. No. 6,745,242, entitled "Connectivity Service-Level Guarantee Monitoring And Claim Validation Systems and Methods," filed on Nov. 30, 1999, which is related to copending application, U.S. patent application Ser. No. 09/450,549, entitled "Packet Loss Service-Level Guarantee Monitoring and Claim Validation Systems and Methods," filed concurrently therewith, each of which is hereby incorporated by reference in its entirety.

BACKGROUND OF THE INVENTION

A. Field of the Invention

The present invention relates generally to quality of service guarantees and, more particularly, to systems and methods for providing connectivity service-level guarantees for network communication.

B. Description of Related Art

In the highly competitive Internet service provision industry, service-level guarantees (SLGs) have become an extremely important market differentiator. The trend in SLGs has included a movement toward service contracts that attach financial penalties to failures to meet certain key network performance criteria. Since the industry remains in a state of flux, service providers must constantly extend and revise their SLGs to compete. As a result, service providers must face the dilemma of formulating meaningful performance criteria to attract and retain business, while avoiding imposing a financially ruinous burden on the company.

An important aspect of SLGs is compliance monitoring. Currently, SLGs are reactive in the sense that customers must monitor performance and submit a claim when they experience poor service. At the same time, however, the service provider must monitor its own performance, both to make sure that sufficient resources are available to comply with its SLGs, and to verify and validate customer claims.

A typical SLG criteria includes the measurement of connectivity or reachability (i.e., a determination of the availability of a network resource). Conventional systems measure connectivity by pinging (i.e., sending an Internet Control Message Protocol (ICMP) ping packet to a resource and waiting for a reply) every resource, such as a router, from every resource. This produces an unmanageable burden, however, on network resources. In addition, sending the pings between all possible source-destination pairs, as well as collecting and analyzing the data, requires processing that is very difficult to administer.

As a result, a need exists for a system that facilitates monitoring of connectivity to validate customer SLG claims.

SUMMARY OF THE INVENTION

Systems and methods consistent with the present invention address this need by pinging select network resources and combining the results to monitor connectivity and validate customer SLG claims.

In accordance with the purpose of the invention as embodied and broadly described herein, a system monitors performance in a network that includes several network resources. The system obtains a list of targets in the network. The targets include selected ones of the resources. The system sends a request to the targets, receives responses from the targets, and determines a status of the targets based on the received responses or a lack of responses from the targets. The system then analyzes the status of the targets to determine compliance with the service-level guarantee.

In another implementation consistent with the present invention, a method validates customer claims relating to performance in a network. The method includes periodically collecting network status records, the network status records being obtained by pinging select resources in the network; receiving one of the customer claims, the claim identifying a path in the network between a source and a destination and a time interval for which an outage was experienced; identifying resources located on the path; analyzing the network status records relating to the identified resources to determine whether any of the identified resources experienced an outage lasting at least a predetermined period of time.

In a further implementation consistent with the present invention, a method for validating a claim relating to a service-level guarantee includes receiving the claim from a customer, the claim identifying a first path in a network from a source to a destination, a second path from the destination to the source, and a time interval for which an outage was experienced in the network; and validating the claim by collecting network status data reflecting availability of resources along the first and second paths and determining compliance with the service-level guarantee based on the collected network status data.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is an exemplary diagram of pinging records maintained by the server of FIG. 3;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention facilitate connectivity service-level guarantee (SLG) monitoring and verification by pinging certain resources in a network to determine the status of the resources, and tracking transitions in the status.

Exemplary System

Figure 1:
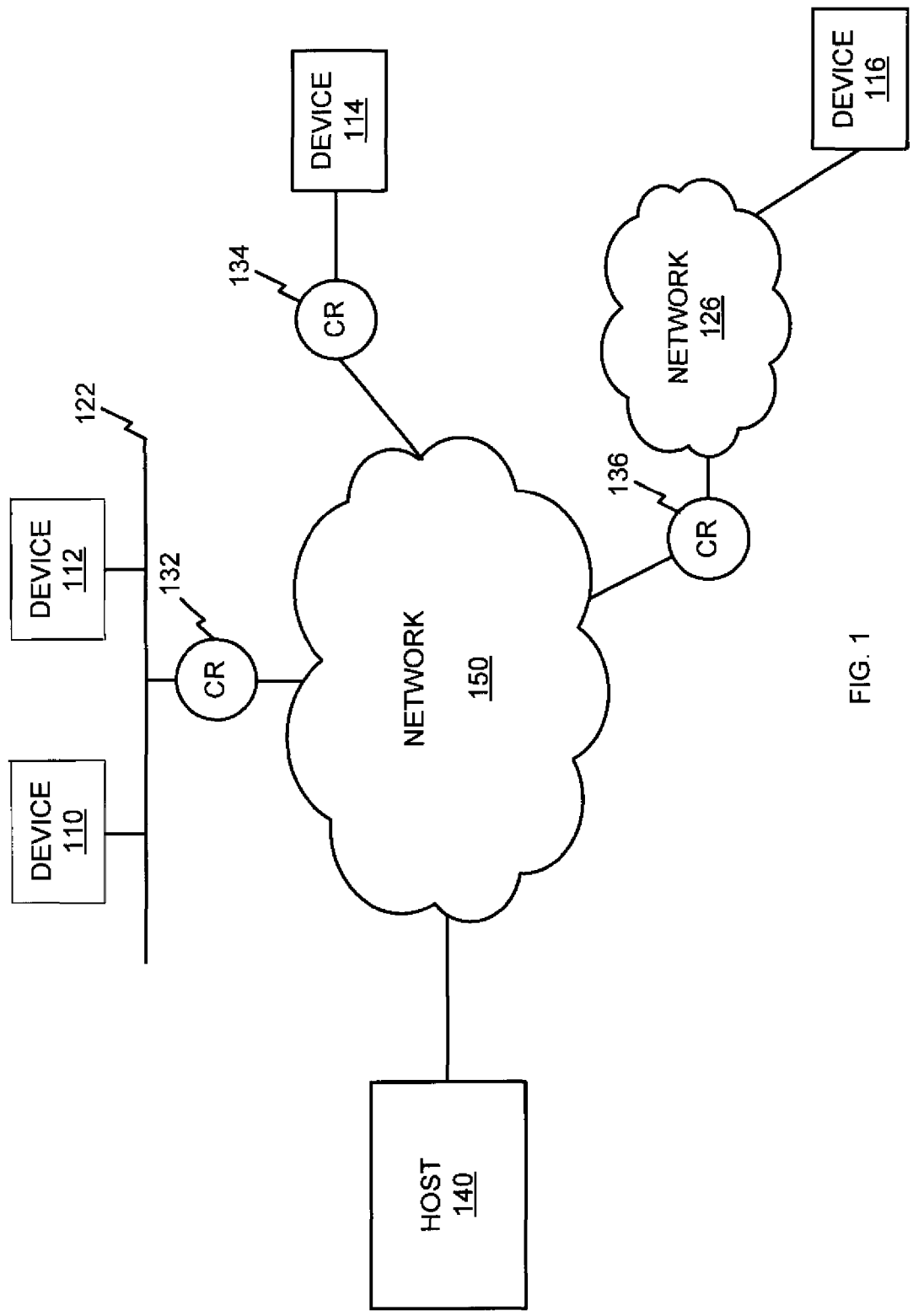
FIG. 1 is a diagram of an exemplary system in which systems and methods consistent with the present invention may be implemented.

FIG. 1 is an exemplary system 100 in which systems and methods consistent with the present invention may be implemented. The system 100 includes several devices 110-116 and a host server 140 connected to a network 150. The devices 110-116 may include any mechanism capable of communicating over the network 150, including, for example, a personal computer, a personal digital assistant (PDA), a cellular or wireless communications device, such as a mobile telephone, etc.

The devices 110-116 may connect to the network 150 via a customer router 132-136 using wired or wireless communication mechanisms. For example, devices 110 and 112 connect to the network 150 via a local area network (LAN) 122 and a customer router 132; device 114 connects to the network 150 via a customer router 134 using a wired or wireless connection; and device 116 connects to the network 150 via another network 126, such as the Internet, an intranet, a wide area network (WAN), a LAN, or a similar network, and a customer router 136. FIG. 1 shows four devices connected to the network 150 for simplicity. One skilled in the art would recognize that different numbers of devices may connect to the network 150 in a number of different ways.

Figure 2:
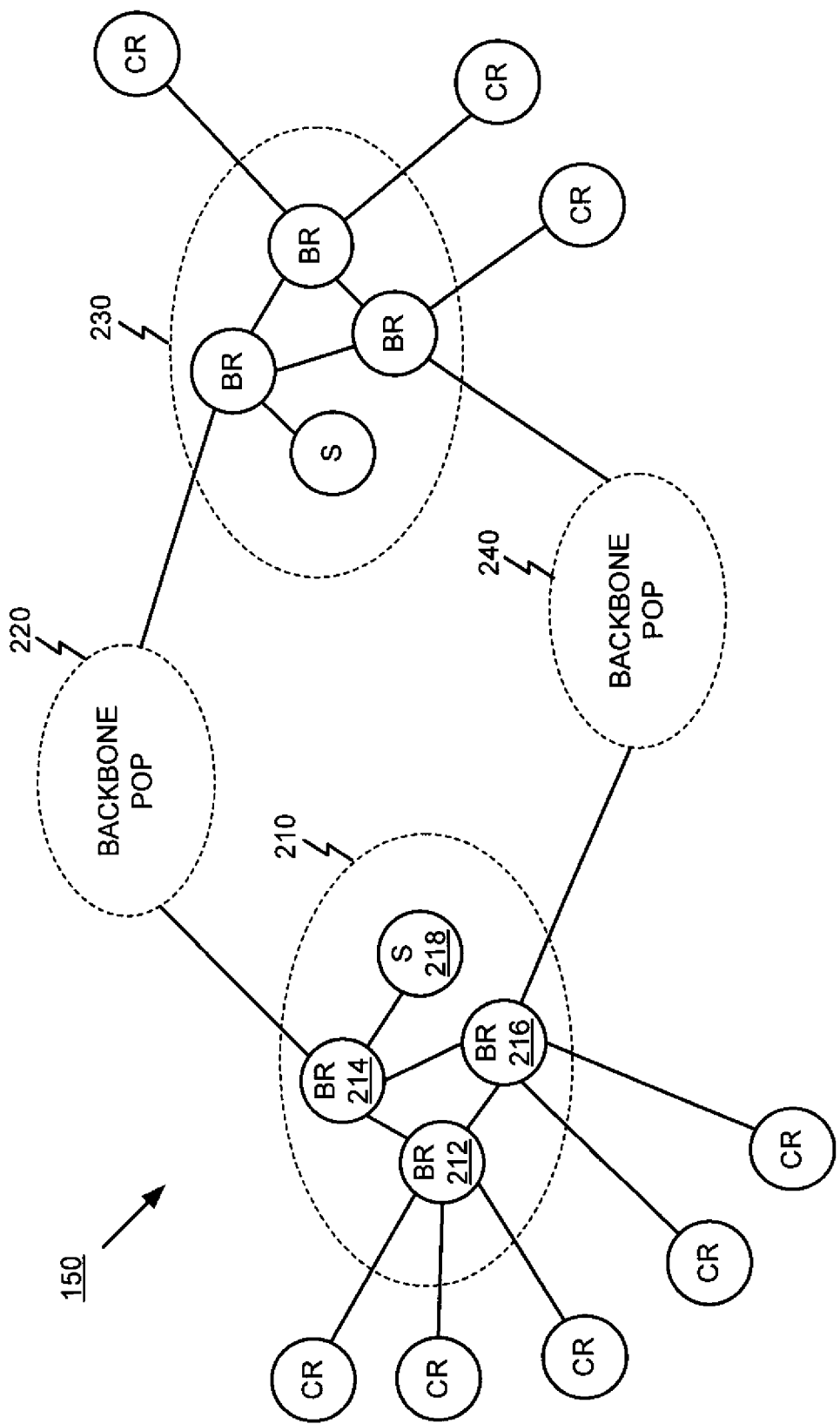
FIG. 2 is a detailed diagram of an exemplary network in the system of FIG. 1.

The network 150 may include a packet routing network of a service provider that may include the Internet, an intranet, a wide area network (WAN), etc. FIG. 2 is an exemplary diagram of the network 150 consistent with the present invention, including several interconnected backbone points-of-presence (PoPs) 210-240. Each of the PoPs connects to its neighbor PoPs. For example, PoP 210 connects to PoP 220 and PoP 240. Other configurations are also possible. Four PoPs are shown for simplicity.

Each of the PoPs, such as PoP 210, includes one or more backbone routers (BR) 212-216 and a server 218. The backbone routers interact with customer routers and other backbone routers to transmit data through the network 150.

Figure 3:
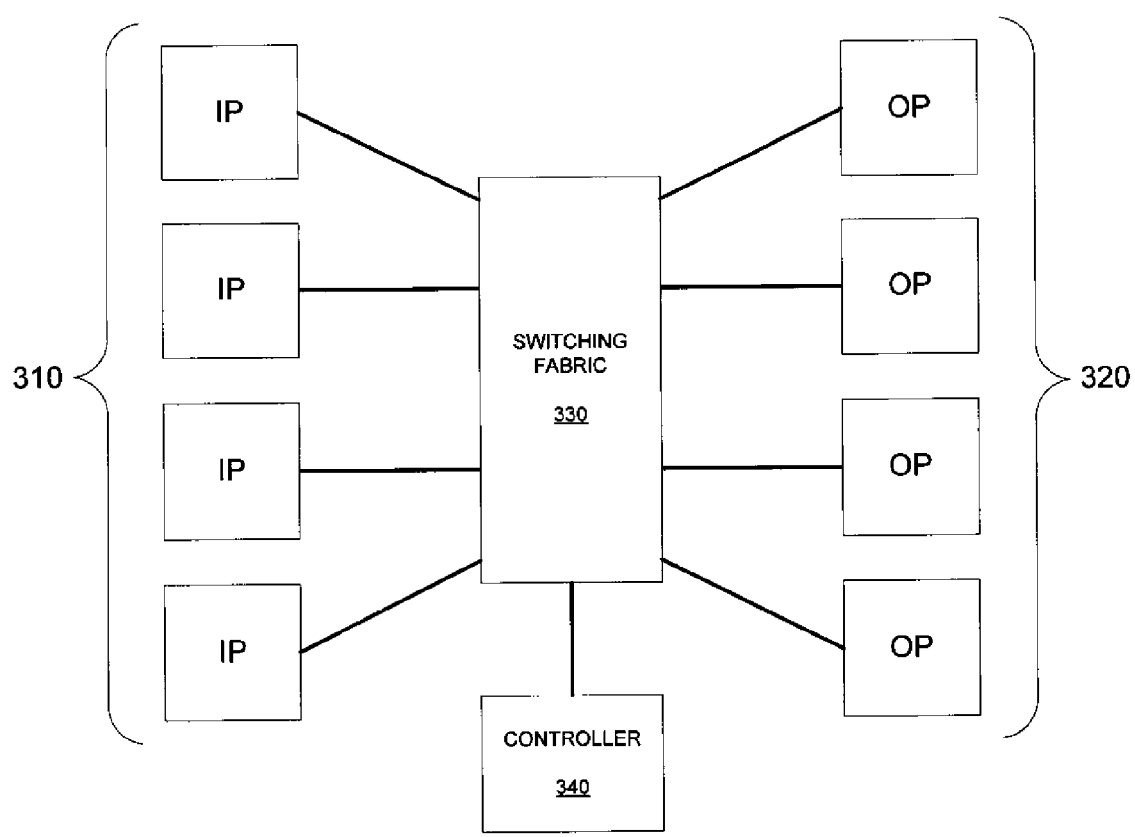
FIG. 3 is a detailed diagram of an exemplary router in the network of FIG. 2.

FIG. 3 is an exemplary diagram of a backbone router 300, consistent with the present invention, in the network 150 of FIG. 2. The router 300 includes several input buffers 310, several output buffers 320, a switching fabric 330, and a controller 340. The input buffers 310 temporarily store received packets, and the output buffers 320 temporarily store packets for transmission.

The switching fabric 330 may include a conventional switch fabric to connect the input buffers 310 to the output buffers 320. The controller 340 controls the operation of the router 300. The controller 340 may include a processor, microprocessor, digital signal processor, etc. that analyzes incoming packets and configures the switching fabric 330 to send the packets to the appropriate output buffers 320.

Figure 4:
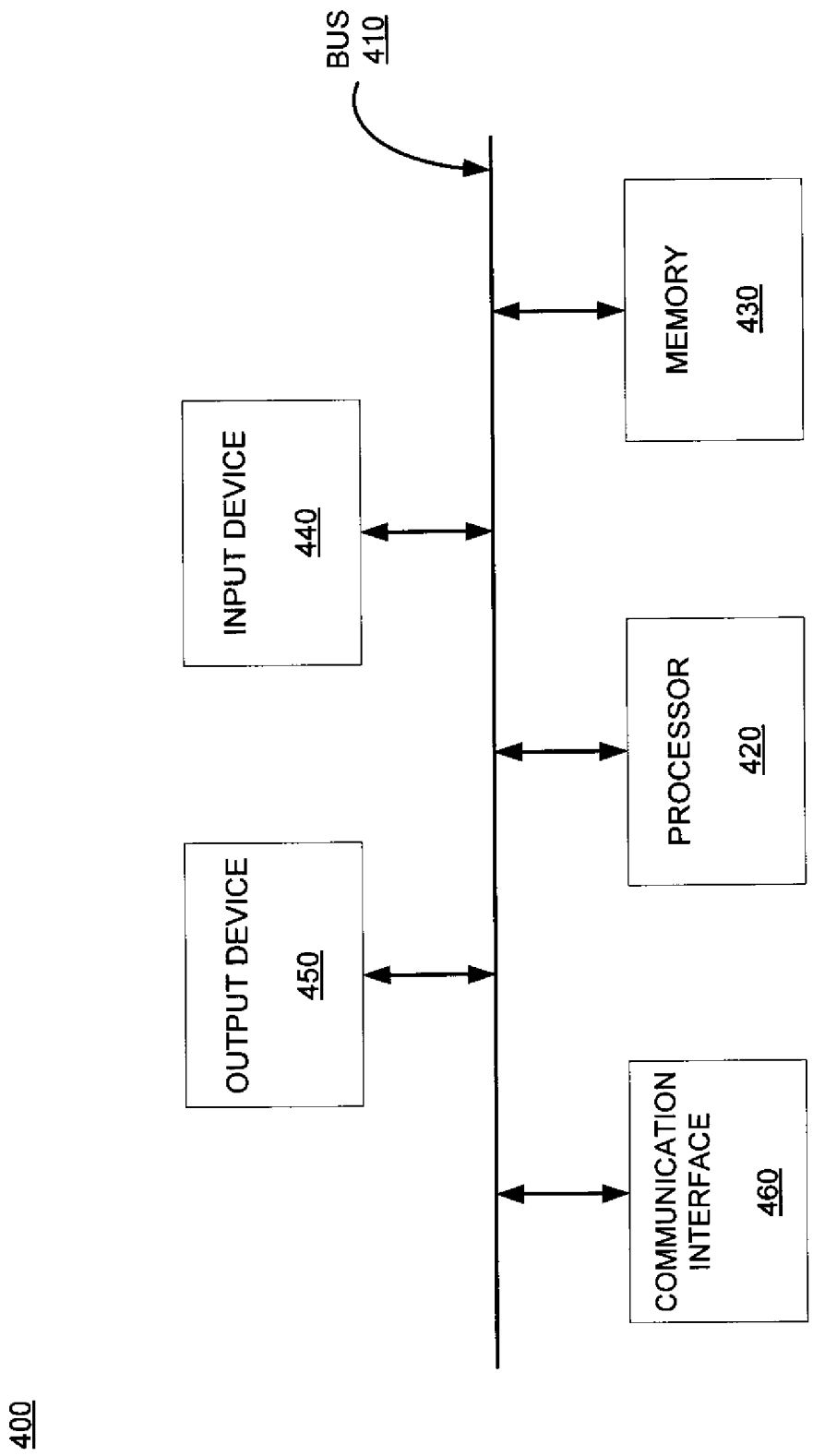
FIG. 4 is a detailed diagram of an exemplary server in the network of FIG. 2.

Returning to FIG. 2, a server, such as server 218, connects to at least one backbone router 214 in the PoP 210. The server 218 sends packets for determining the connectivity of network resources. FIG. 4 is an exemplary diagram of a server 400, such as server 218. The server 400 includes a bus 410, a processor 420, a memory 430, an input device 440, an output device 450, and a communication interface 460. The bus 410 permits communication among the components of the server 400.

The processor 420 may include any type of conventional processor or microprocessor that interprets and executes instructions. The memory 430 may include a RAM or another dynamic storage device that stores information and instructions for execution by the processor 420; a ROM or another type of static storage device that stores static information and instructions for use by the processor 420; and/or some other type of magnetic or optical recording medium and its corresponding drive.

The input device 440 may include any conventional mechanism that permits an operator to input information to the server 400, such as a keyboard, a mouse, a pen, voice recognition and/or biometric mechanisms, etc. The output device 450 may include any conventional mechanism that outputs information to the operator, including a display, a printer, a pair of speakers, etc. The communication interface 460 may include any transceiver-like mechanism that enables the server 400 to communicate with a backbone router, such as router 214 (FIG. 2).

The server 400 maintains a list of targets, including other servers in the network 150, as well as any connected customer routers. The server 400 determines target connectivity (i.e., reachability) using a pinging process ("pinger") in combination with an enhanced pinging process ("multiping") to ping all of the targets on the list. The server 400 may use rules derived from Internet Engineering Task Force (IETF) guidelines (available on their web site at www.ietf.cnri.reston.va.us/home.html) to determine when a particular target is unreachable. The IETF guidelines specify, for example, the frequency of pings (e.g., 10 milliseconds), the length of timeouts (e.g., 1 second), and the fraction of pings that must be answered for a target to be declared reachable (e.g., 5-out-of-20).

The server 400 also tracks its own heartbeat signals to determine its own status on a periodic basis at relatively short intervals. Reception of a heartbeat signal indicates to the server 400 whether the absence of a recorded outage was due to a monitoring problem or due to the fact that the outage never took place.

The server 400 may maintain records of results of the pinging, or to conserve storage space, may record only state transitions or status changes (i.e., a transition from reachable to unreachable, or vice versa). Because the recording of state transitions is susceptible to a loss of information and incorrect inferences, the server 400 may verify the status of all the targets on its list on a periodic basis at relatively long intervals.

FIG. 5 is an exemplary diagram of pinging records 500 maintained by the server 400. The records 500 include a heartbeat (H-type) record 510, a status (S-type) record 520, and an event (E-type) record 530. The heartbeat record 510 stores information regarding the heartbeat signals, and may include three fields: a source name 511, an identifier (ID) 512, and a timestamp 513. The source name 511 indicates the name of the source host (i.e., the server). The identifier 512 identifies the record as a heartbeat record. The timestamp 513 indicates a time at which the record was obtained.

The status record 520 stores information regarding the periodic status verifications, and may include five fields: a source name 521, an identifier (ID) 522, a timestamp 523, a target name 524, and a status 525. The source name 521 indicates the name of the source host. The identifier 522 identifies the record as a status record. The timestamp 523 indicates a time at which the record was obtained. The target name 524 indicates the name of the target host (i.e., a target of the pings). The status 525 indicates whether the target host was reachable or unreachable.

The event record 530 stores information regarding state transitions, and may include five fields: a source name 531, an identifier (ID) 532, a timestamp 533, a target name 534, and a status 535. The source name 531 indicates the name of the source host. The identifier 532 identifies the record as an event record. The timestamp 533 indicates a time at which the record was obtained. The target name 534 indicates the name of the target host (i.e., a target of the pings). The status 535 indicates whether the target host was reachable or unreachable.

Returning to FIG. 1, the host 140 periodically collects the results (stored in the pinging records 500) from the servers and parses them into individual outage records. The host 140 may also maintain a "state of the network" record that summarizes occurrences since the last collection period.

Figure 6:
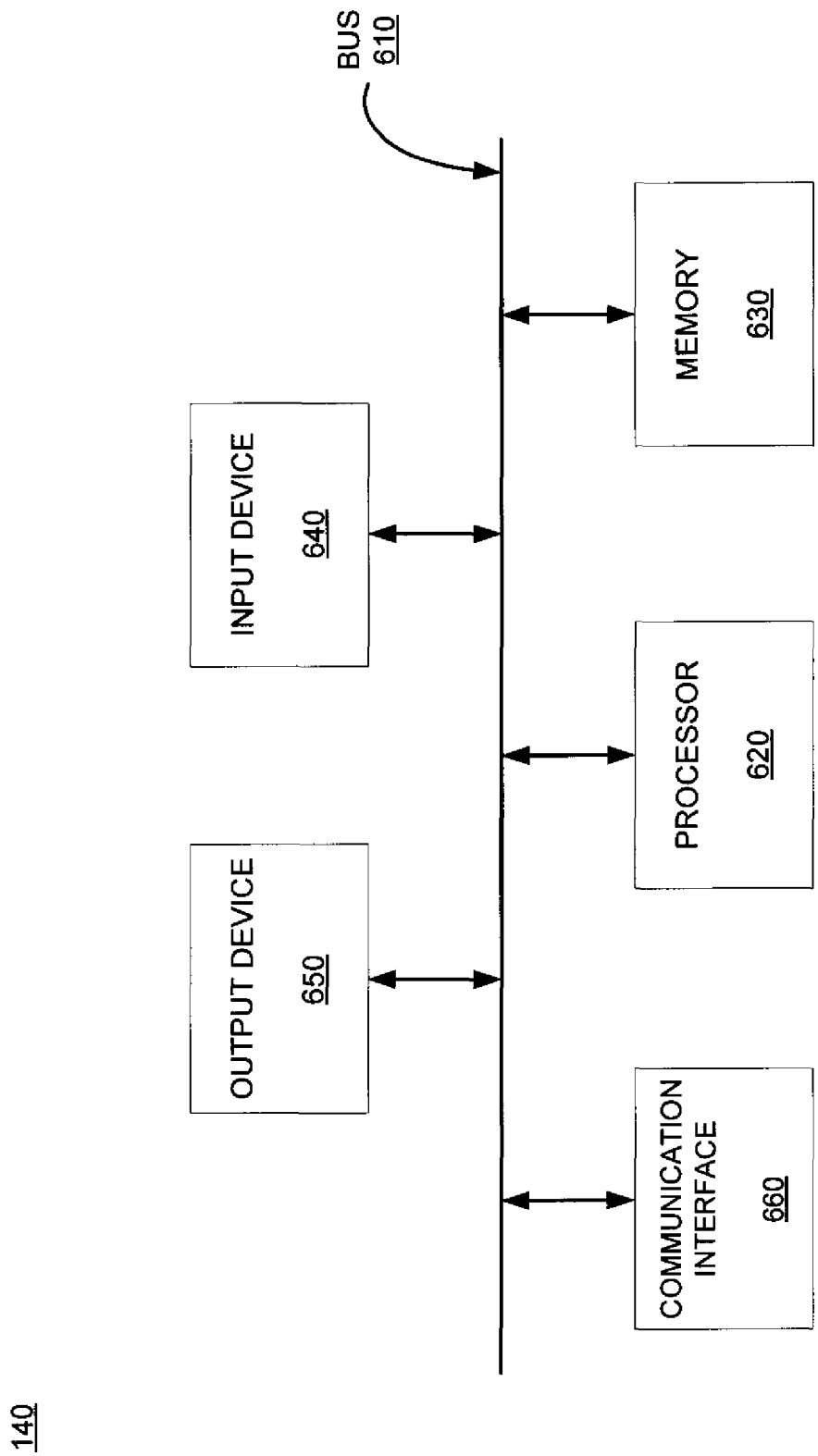
FIG. 6 is a detailed diagram of an exemplary host in the system of FIG. 1.

FIG. 6 is an exemplary diagram of the host 140 in an implementation consistent with the present invention. The host 140 includes a bus 610, a processor 620, a memory 630, an input device 640, an output device 650, and a communication interface 660. The bus 610 permits communication among the components of the host 140.

The processor 620 may include any type of conventional processor or microprocessor that interprets and executes instructions. The memory 630 may include a RAM or another dynamic storage device that stores information and instructions for execution by the processor 620; a ROM or another type of static storage device that stores static information and instructions for use by the processor 620; and/or some other type of magnetic or optical recording medium and its corresponding drive.

The input device 640 may include any conventional mechanism that permits an operator to input information to the host 140, such as a keyboard, a mouse, a pen, voice recognition and/or biometric mechanisms, etc. The output device 650 may include any conventional mechanism that outputs information to the operator, including a display, a printer, a pair of speakers, etc. The communication interface 660 may include any transceiver-like mechanism that enables the host 140 to communicate with other devices and/or systems. For example, the communication interface 660 may include mechanisms for communicating via a network, such as network 150 (FIG. 1).

Exemplary Network Monitoring

Figure 7:
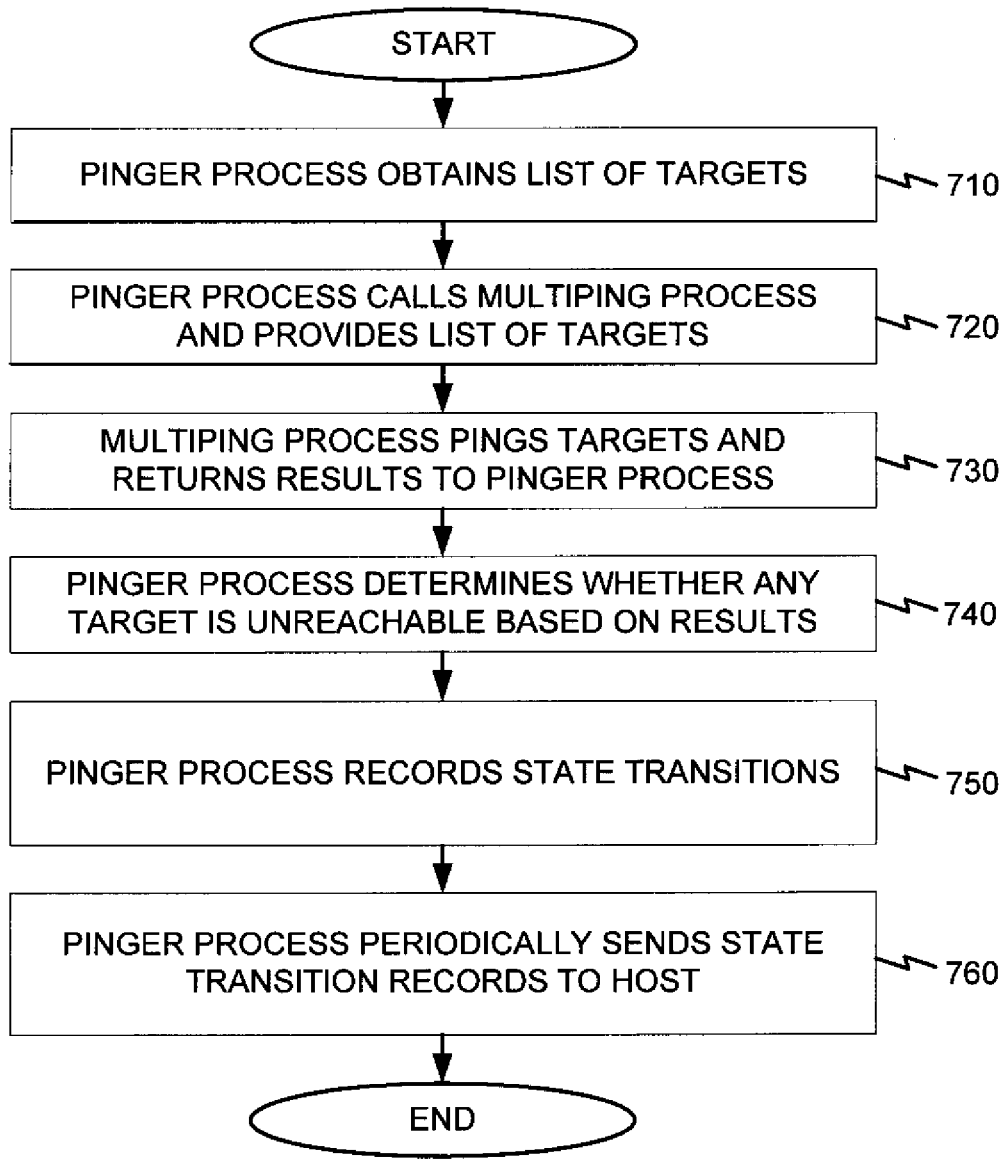
FIG. 7 is a flowchart of network monitoring consistent with the present invention.

FIG. 7 is a flowchart of network monitoring consistent with the present invention. The pinger process within each of the servers interacts with the multiping process to monitor end-to-end connectivity (i.e., reachability). The pinger process may follow the definition given by the IETF for determining whether a target is considered reachable. The IETF defines a target as reachable if at least 5 out of 20 requests have been acknowledged, with a recommended timeout of 10 seconds.

To monitor network status, the pinger process first obtains a list of targets to be pinged [step 710]. The pinger process may obtain the list from an automated process (internal or external to the server) designed to monitor network developments and generate the list. The targets include other servers in the network 150 and any connected customer routers. The pinger process then initiates the multiping process to perform the actual pinging of the targets [step 720]. The pinger process provides the muitiping process with a list of targets to be pinged.

The pinger process might issue a call, such as
multiping <options> target-1 target-2 . . . .
In response to the command, the multiping process constructs an array of records with information for each target, and then issues the following sequences [step 730]:
echo-request-1 target-1 echo-request-1 target-2 echo-request-1 target-3 . . . .
echo-request-2 target-1 echo-request-2 target-2 echo-request-2 target-3 . . . .

For simplicity, the first set of echo requests (to target-1, target-2, etc.) will be referred to as sequence 1, the second set of echo requests as sequence 2, etc.; the set of all sequences as a cycle; the interval between each consecutive request within each sequence as the inter-packet-gap (ipg); and the interval between the sequences as the inter-sequence interval (i). The interval (between sequences) may be defined in one of two ways: (1) as the time between the kth echo request to target-1 and the (k+1)st echo request to target-1; or (2) as the time between the kth echo request to target-m (i.e., the last target) and the (k+1)st request to target-1.

The call issued by the pinger process might includes several parameters in the "<options>" field of the call. For example, the parameters might include:

| | |
|---|---|
| -g <ms_value>: | The inter-packet gap (ipg) value in milliseconds (default = 10 ms) |
| -j <ms_value>: | The inter-sequence interval value in milliseconds (default = 1000 ms). |
| -e | The exact interval flag instructs the multiping process to use the second definition of the inter-sequence value. |
| -t <ms_value>: | Timeout in milliseconds. All packets received after 'start of the sequence + timeout value' are ignored (default = i). |
| -w <ms_value>: | Wait for some number of milliseconds before sending out the first echo request. The main reason for this option is to minimize interference between multiple instances of multiping that start at roughly the same time. |
| -s <ip_address>: | Source host address. This may be used if the source host is multihomed (i.e., a host with more than one connection to the network). |

The main goal of the multiping process is to multiplex the pings between multiple targets. Assume that the multiping process issues 10 Internet Control Message Protocol (ICMP) echo requests to a single target with a 1 second interval, and that the implicit timeout is 1 second. If the multiping process uses the first definition of the interval (i), then the process keeps all of the echo requests within the sequence as close to each other as possible. For instance, given 10 targets, if the ipg is set to 10 milliseconds (ms), it will take 100 ms for the multiping process to issue all of the echo requests, leaving 900 ms for reception of echo responses before the next sequence starts. In this particular case, the effective timeout is 900 ms, not 1 second:

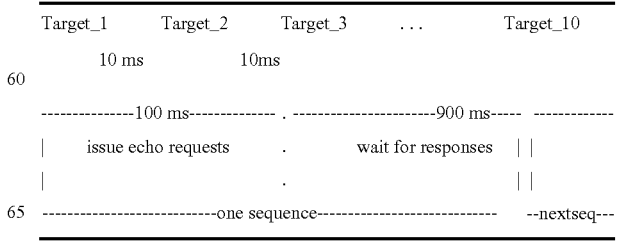

The corresponding request to the multiping process has the following syntax, assuming there are to be 20 pings to each target and the first definition of the interval (i) is used:

multiping-c 5-g 10-i 1000 target-1 target-2 target-3 . . . target-n, where -c is the sequence count, -g is the ipg value in ms, and -i is the inter-sequence interval in 20 ms.

If, on the other hand, the multiping process uses the second definition of the interval (i), then the pinger process might use the exact interval (-e) flag in its call to the multiping process. The call might take the form of:

multiping-c 5-g 10-i 1000-e target-1 target-2 target-3 . . . target-n.

In this case, the multiping process interprets the factor "-i 1000" as 1000 ms between the kth request of the last target and the (k+1)st request to the first target. The interval between each sequence is no longer 1000 ms, but 1000+(ipg*(n−i)).

Once the multiping process issues the echo requests and collects the responses for each sequence, it returns the results to the pinger process [step 730]. The results might take the form of:

C<seq_number> <target_1_status> <target_2_status> . . . <target_n_status>

The status indicates whether the target is reachable or unreachable. "Reachable" here means that the multiping process received a valid ICMP echo reply, and "unreachable" means that the multiping process received something other than a valid ICMP echo reply (e.g., a timeout or an ICMP bounced).

The pinger process analyzes the results from the multiping process to determine whether any of the targets is unreachable [step 740]. Each time the pinger process receives results from the multiping process, it checks the 20 most-recent results to determine whether 5 or more requests have been acknowledged in the way of an ICMP echo reply by each of the targets. If 5 or more requests have been acknowledged, then the pinger process declares that target reachable. Otherwise, it declares the target unreachable.

The pinger process records any transitions from reachable to unreachable, and vice versa, as an event in the E-type record 530 (FIG. 5) [step 750]. The advantage of recording only state transitions is conservation of storage. There is always the risk, however, that a particular transition was missed or not recorded, and that the state of that particular target is, therefore, unknown. To prevent this from happening, the pinger process records the current state of the targets periodically at relatively long intervals, and stores the information in the S-type record 520. Also, the lack of a recorded state transition may be due either to the fact that a state transition did not occur or to the fact that there was some sort of failure in the multiping process during the time of the transition. To verify that there was no failure, the pinger process records a heartbeat signal periodically at relatively short intervals, and stores the signal in the H-type record 510.

Periodically, the pinger process transfers all of its records (H, S, and E-types) to the host 140 for processing [step 760]. The host 140 summarizes the records into individual outage records. To do this, the host 140 interprets and then eliminates the cumbersome heartbeat and periodic status records and stores only noteworthy events, such as the absence of a heartbeat or a status change, in memory. The host 140 may also maintain a "state of the network" file that summarizes the network's status at the end of the previous collection period.

Exemplary Claim Validation Processing

Figure 8:
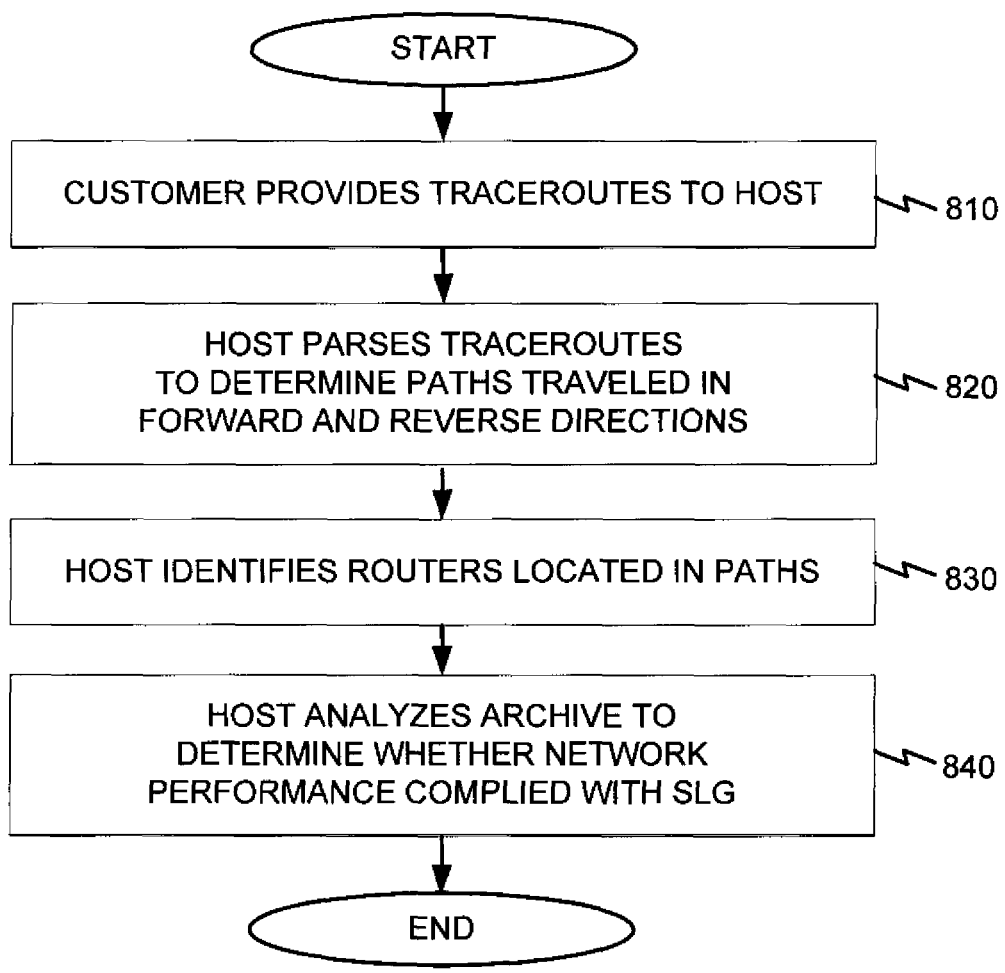
FIG. 8 is a flowchart of claim validation processing consistent with the present invention.

FIG. 8 is a flowchart of claim validation processing consistent with the present invention. When a customer experiences an outage as a result of a network malfunction or outage, for example, the customer obtains traceroutes of the path experiencing the malfunction or outage. If the customer does not have the ability to perform the traceroutes from the customer's source host to the destination host, and vice versa, the customer may obtain the traceroutes in a manner described in the previously-incorporated, copending application Ser. No. 09/450,549

Once the customer obtains the traceroutes, the customer sends a claim, including the traceroutes and the time interval in which the outage occurred, to the host 140 [step 810]. The customer may do this, for example, by emailing the claim to the host 140.

The host 140 parses the traceroutes to determine the paths traveled in the forward (source-to-destination) and reverse (destination-to-source) directions [step 820]. The host 140 then generates a list of routers located within each of the paths [step 830]. The host 140 uses the list to identify servers associated with the routers. The host 140 then analyzes the records stored in its memory relating to the identified servers to determine whether network performance complied with the SLG [step 840].

To make this determination, the host 140 does not determine whether the customer ever suffered an outage, but rather whether the outage lasted at least a predetermined period of time, such as 10 minutes. The host 140 analyzes the records stored in memory to determine whether the routers in the paths were out for a sustained 10-minute period. Based on its findings, the host 140 determines whether to credit the customer for the outage.

Figure 9:
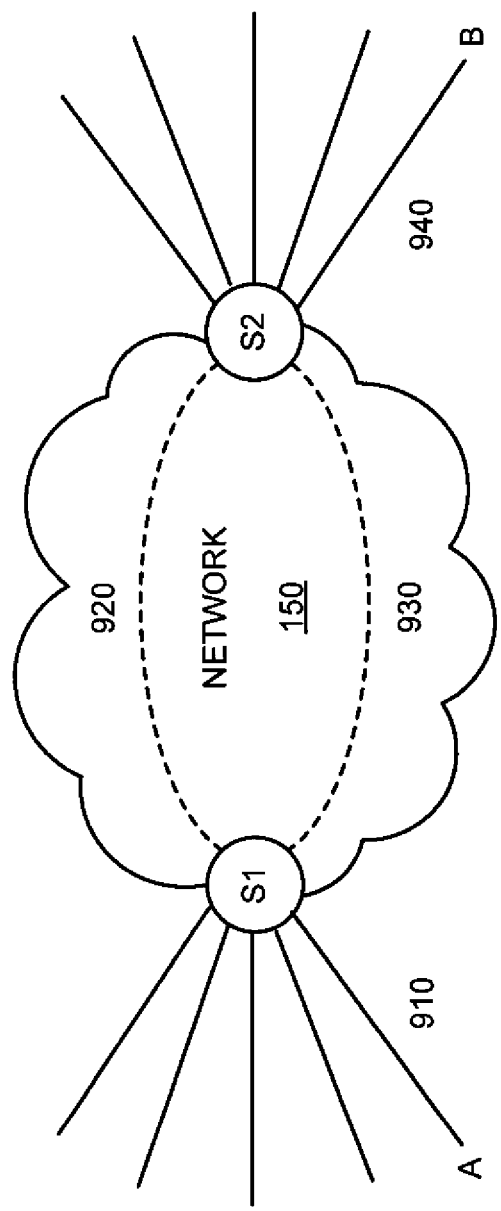
FIG. 9 illustrates an example of records analyzed by the host to determine whether network performance complied with the SLG.

FIG. 9 illustrates an example of the records analyzed by the host 140 to determine whether network performance complied with the SLG. Assume, for example, that customer A provides a claim to the host 140 indicating an outage in reaching destination B. Assume further that customer A connects to the network 150 via a PoP containing server S1, and that destination B connects to the network 150 via a PoP containing server S2. The host 140 pieces together the end-to-end path by analyzing three sets of records for the time period in question: the records corresponding to the path 910 from S1 to A, the records corresponding to the paths 920 and 930 between S1 and S2; and the records corresponding to the path 940 from S2 to B. Based on this information, the host 140 can determine whether network performance complied with the SLG.

Conclusion

Systems and methods consistent with the present invention monitor and validate connectivity service-level guarantees by selectively pinging network resources.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, the preceding description relates to a reactive system by which the system determines compliance with its SLG in response to a customer claim. The description equally applies, however, to proactive systems by which the system continuously monitors network performance to determine compliance with its SLG.

In addition, the preceding description described the servers as performing the pinging operations. In another implementation consistent with the present invention, the host server performs the pinging of the network resources. In yet another implementation consistent with the present invention, the routers ping other routers to determine connectivity.

The scope of the invention is defined by the claims and their equivalents.

What is claimed is:

1. A computer-implemented method that validates at least one customer claim relating to performance in a network, comprising:
   receiving a customer claim, the claim identifying a path in the network between a source and a destination and a time interval for which an outage was experienced;
   identifying, via a computer processor, resources located on the path and servers associated with the identified resources located on the path, wherein identifying resources comprises:
      parsing a first path from the source to the destination,
      parsing a second path from the destination to the source, and
      identifying resources located on the first and second paths; and
   validating, via the computer processor, the customer claim by analyzing network status records relating to the servers associated with the identified resources to determine whether any of the identified resources experienced an outage lasting at least a predetermined period of time, wherein the analyzing the network status records comprises:
   identifying portions of the path between the identified resources, and
   analyzing network status records associated with each of the portions of the path.

2. The method of claim 1, further comprising:
   periodically collecting the network status records.

3. The method of claim 1, wherein analyzing the network status records includes:
   examining the network status records obtained during the time interval.

4. The method of claim 1, further comprising:
   determining whether to credit the customer based on a result of the analysis.

5. A system that validates at least one customer claim relating to performance in a network, a customer claim identifying a path in the network between a source and a destination and a time interval for which an outage was experienced, the system comprising:
   a memory that stores instructions; and
   a processor that executes the instructions stored in the memory to identify resources located on the path and servers associated with the identified resources located on the path, wherein when identifying resources, the processor is configured to parse a first path from the source to the destination, parse a second path from the destination to the source, and identify resources located on the first and second paths, and validate the customer claim by analyzing network status records relating to the servers associated with the identified resources to determine whether any of the identified resources experienced an outage lasting at least a predetermined period of time, wherein when analyzing the network status records, the processor is configured to:
   identify portions of the path between the identified resources; and
   analyze network status records associated with each of the portions of the path.

6. The system of claim 5, wherein the processor is further configured to:
   periodically collect the network status records.

7. The system of claim 5, wherein the processor is further configured to determine whether to credit the customer based on a result of the analysis of the network status records.

8. A non-transitory computer-readable medium that stores instructions executable by a computer to perform a method for validating at least one customer claim relating to performance in a network, a customer claim identifying a path in the network between a source and a destination and a time interval for which an outage was experienced, the method comprising:
   receiving the customer claim;
   identifying resources located on the path and servers associated with the identified resources located on the path, identified by the customer claim, wherein when identifying resources, the computer-readable medium is configured to:
      parse a first path from the source to the destination,
      parse a second path from the destination to the source, and
      identify resources located on the first and second paths; and
   validating the customer claim by analyzing network status records relating to the servers associated with the identified resources to determine whether any of the identified resources experienced an outage lasting at least a predetermined period of time, wherein when analyzing the network status records, the computer-readable medium is configured to:
   identify portions of the path between the identified resources; and
   analyze network status records associated with each of the portions of the path.

9. The non-transitory computer-readable medium of claim 8, further configured to:
   periodically collect the network status records.

10. The non-transitory computer-readable medium of claim 8, further configured to:
   determine whether to credit the customer based on a result of the analysis.

11. A method of validating at least one customer claim relating to a service-level guarantee, comprising:
   receiving the customer claim from a customer, the customer claim identifying a first path in a network from a source to a destination, a second path from the destination to the source, and a time interval for which an outage was experienced in the network; and
   validating, via a computer processor, the customer claim by analyzing network status data relating to servers associated with resources along the first and second paths to determine availability of the resources along the first and second paths and determining compliance with the service-level guarantee based on the network status data, wherein validating the customer claim includes: identifying portions of the first and second paths between ones of the resources;
   and analyzing network status data associated with each of the portions of the first and second paths.

12. The method of claim 11, further comprising:
   collecting network status data.

13. The method of claim 11, further comprising:
   determining whether to credit the customer based on a whether there was compliance with the service-level guarantee.

* * * * *